US012750735B2

(12) United States Patent
Kim et al.

(10) Patent No.: US 12,750,735 B2
(45) Date of Patent: Sep. 29, 2026

(54) METHODS AND PROTOCOLS FOR USER CENTRIC COMMUNICATION AND COMPUTE SUPPORTING COMPUTE RESOURCE SHARING AND NETWORK CONNECTIVITY RESOURCE SHARING

(71) Applicant: MEDIATEK INC., Hsinchu (TW)

(72) Inventors: Bong Ho Kim, San Jose, CA (US); Doru Calin, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 92 days.

(21) Appl. No.: 18/616,382

(22) Filed: Mar. 26, 2024

(65) Prior Publication Data

US 2024/0340703 A1 Oct. 10, 2024

Related U.S. Application Data

(60) Provisional application No. 63/494,785, filed on Apr. 7, 2023.

(51) Int. Cl.
*H04W 28/16* (2009.01)
*H04W 8/18* (2009.01)

(52) U.S. Cl.
CPC ............. *H04W 28/16* (2013.01); *H04W 8/18* (2013.01)

(58) Field of Classification Search
CPC ..... H04L 5/001; H04L 5/0044; H04L 5/0048; H04L 5/0053; H04L 5/0055; H04L 5/0094; H04W 28/16; H04W 4/40; H04W 72/0446; H04W 72/0453; H04W 72/23; H04W 74/0833; H04W 76/11; H04W 76/12; H04W 76/15; H04W 76/27; H04W 8/18; H04W 88/06; H04W 88/085
See application file for complete search history.

(56) References Cited

U.S. PATENT DOCUMENTS

2005/0147071 A1* 7/2005 Karaoguz ............. H04W 88/06 370/338
2010/0115096 A1* 5/2010 Eruchimovitch ............................ H04W 52/0219 709/226
2010/0267368 A1* 10/2010 Masputra .......... H04M 1/72445 455/414.1
2012/0256728 A1* 10/2012 Bajic .................. G06K 7/10019 340/10.1
2016/0353357 A1* 12/2016 Asterjadhi ........ H04W 74/0808
2019/0281455 A1* 9/2019 Luo ........................ H04W 12/08
2021/0126897 A1* 4/2021 Kimn .................... H04L 61/251

FOREIGN PATENT DOCUMENTS

WO WO-2005034411 A2 * 4/2005 ............ H04W 28/16
WO WO-2010008819 A1 * 1/2010 ............. H04L 61/00

* cited by examiner

*Primary Examiner* — Christopher Biagini

(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The method may be performed by a device. In certain configurations, the device provides a distributed device cloud function (DDCF) for handling communication for the device with one or more neighboring devices in a network via underlying access technologies. The device provides a device compute orchestrator (DCO) for orchestrating dynamic sharing of compute resources and network connectivity resources of the device with the neighboring devices in the network. The DCO is placed above a transport layer of the device.

22 Claims, 16 Drawing Sheets

1500

METHODS AND PROTOCOLS FOR USER CENTRIC COMMUNICATION AND COMPUTE SUPPORTING COMPUTE RESOURCE SHARING AND NETWORK CONNECTIVITY RESOURCE SHARING

CROSS-REFERENCE TO RELATED APPLICATION(S)

This application claims the benefits of U.S. Provisional Application Ser. No. 63/494,785, entitled "Methods and protocols for user centric communication and compute supporting compute resource sharing and network connectivity resource sharing" and filed on Apr. 7, 2023, which is expressly incorporated by reference herein in their entirety.

BACKGROUND

Field

The present disclosure relates generally to communication systems, and more particularly, to techniques of methods, apparatuses and protocols for user centric communication and compute supporting compute resource sharing and network connectivity resource sharing.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may be performed by a device. In certain configurations, the device provides a distributed device cloud function (DDCF) for handling communication for the device with one or more neighboring devices in a network via underlying access technologies. The device provides a device compute orchestrator (DCO) for orchestrating dynamic sharing of compute resources and network connectivity resources of the device with the neighboring devices in the network. The DDCF is operable when the device is connected to the network or not connected to the network. The DCO is placed above a transport layer of the device.

In another aspect of the disclosure, a method, a computer-readable medium, and an apparatus are provided. The method may be performed by a device. In certain configurations, the device provides a DDCF. The DDCF is configured to handle communication for the device with one or more neighboring devices in a network via underlying access technologies.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
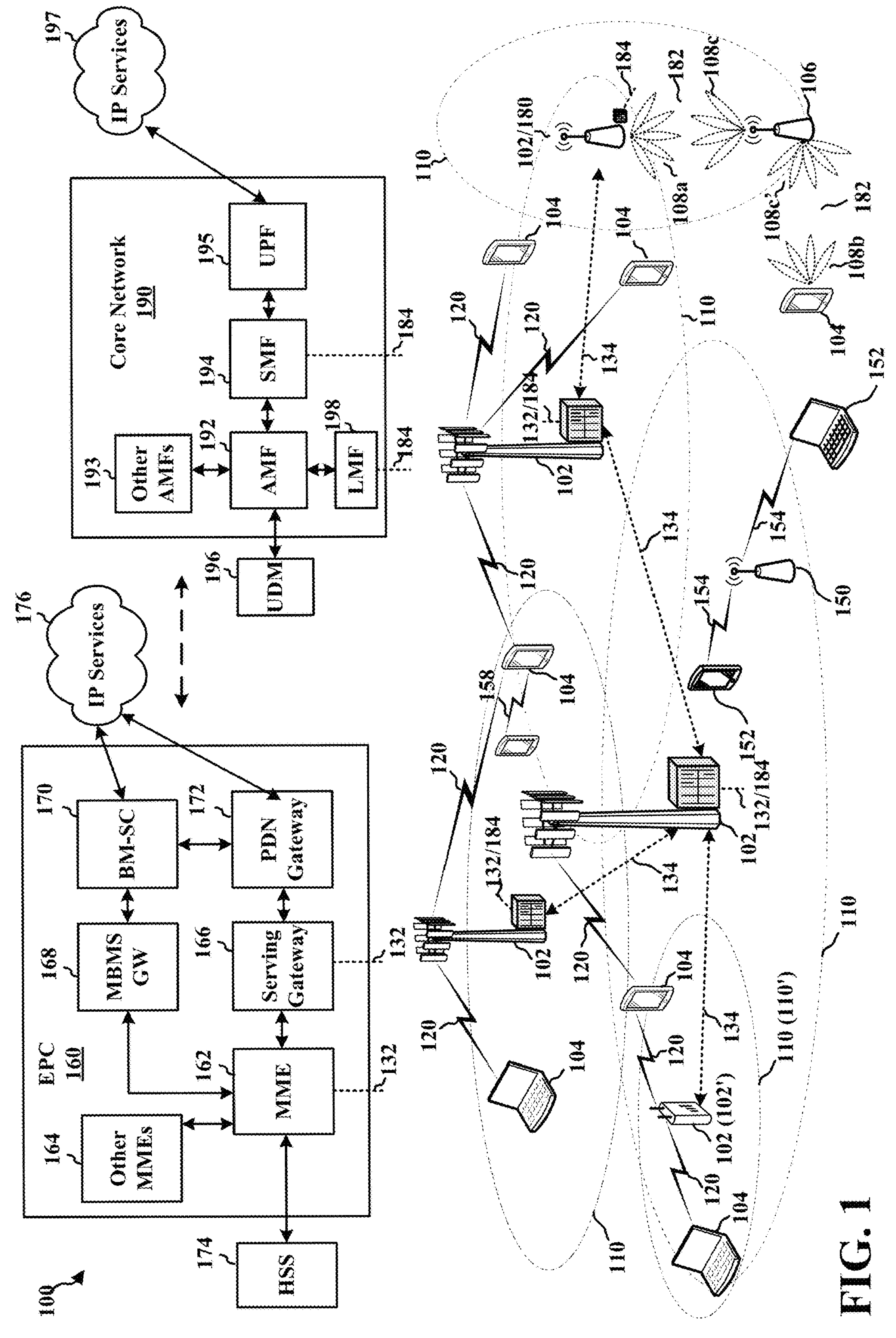
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically crasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage arca 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
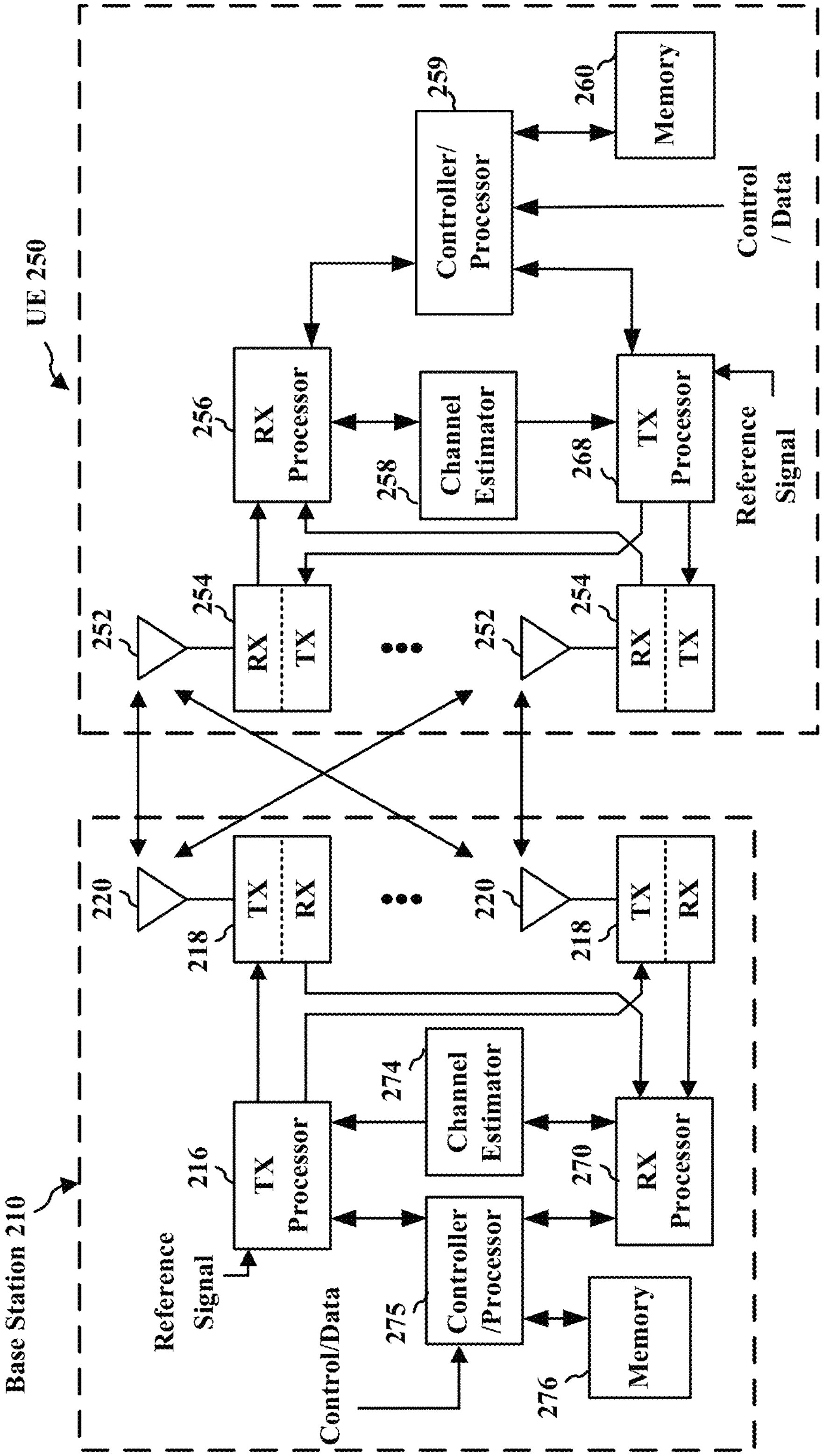
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization. The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHZ), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
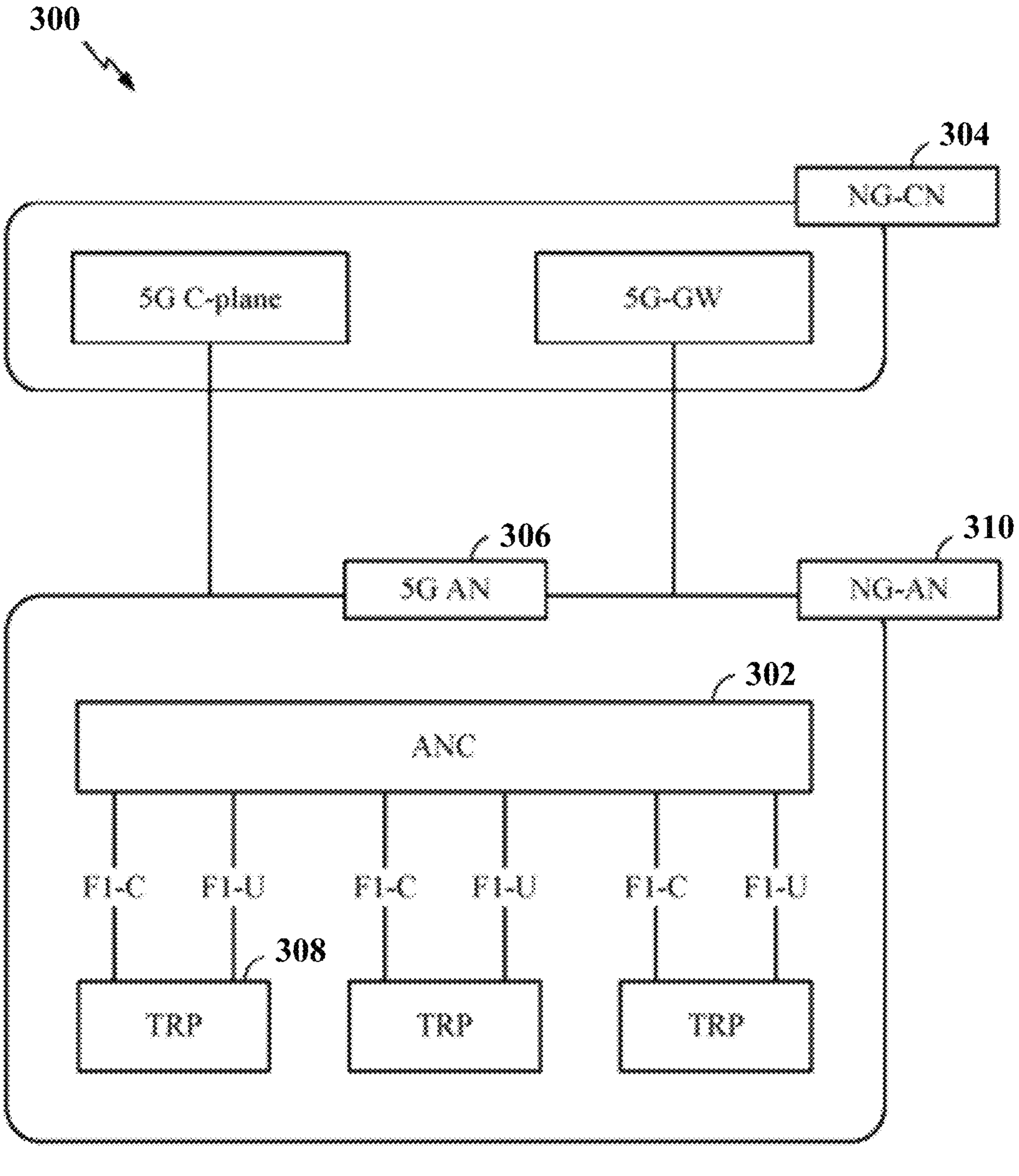
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
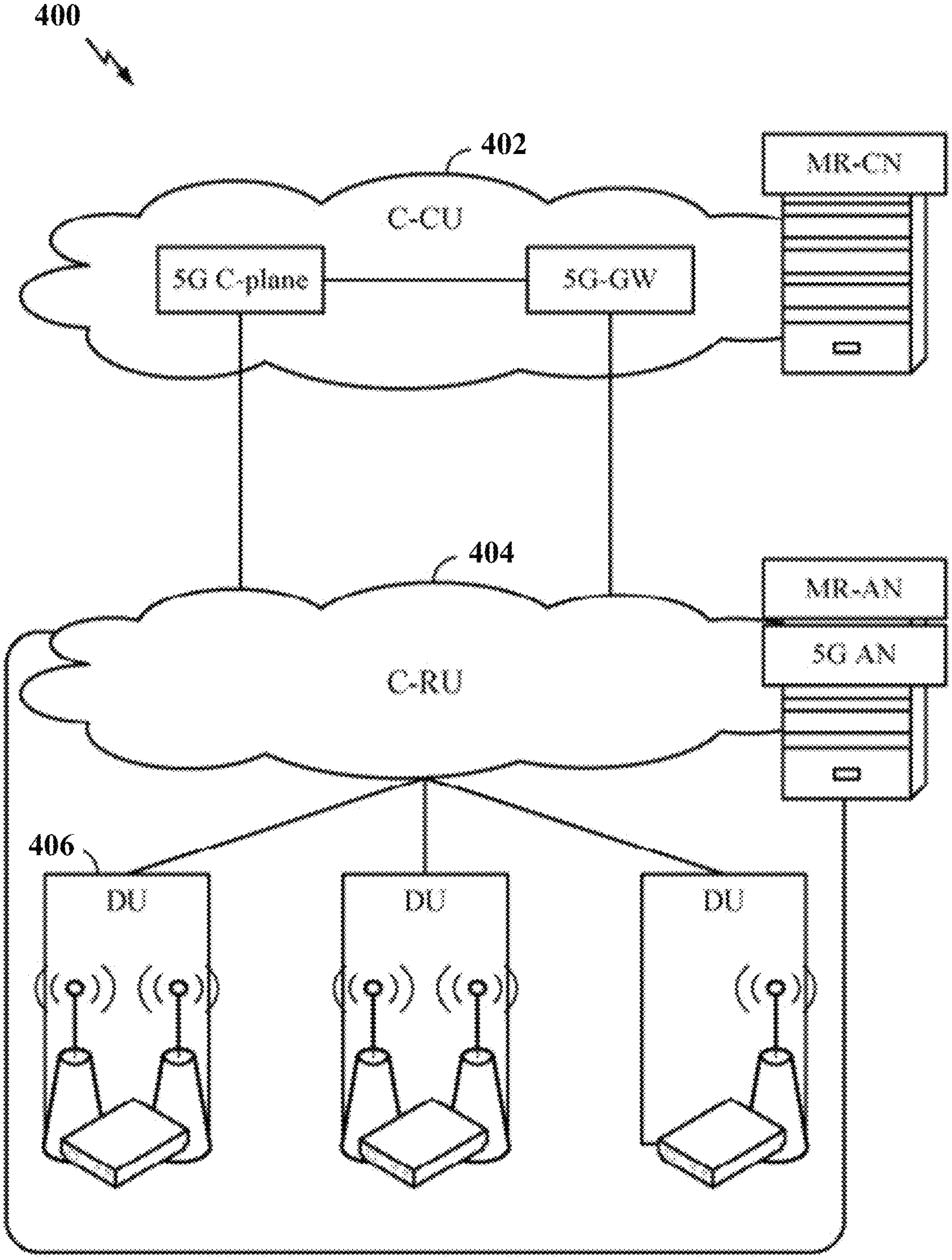
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
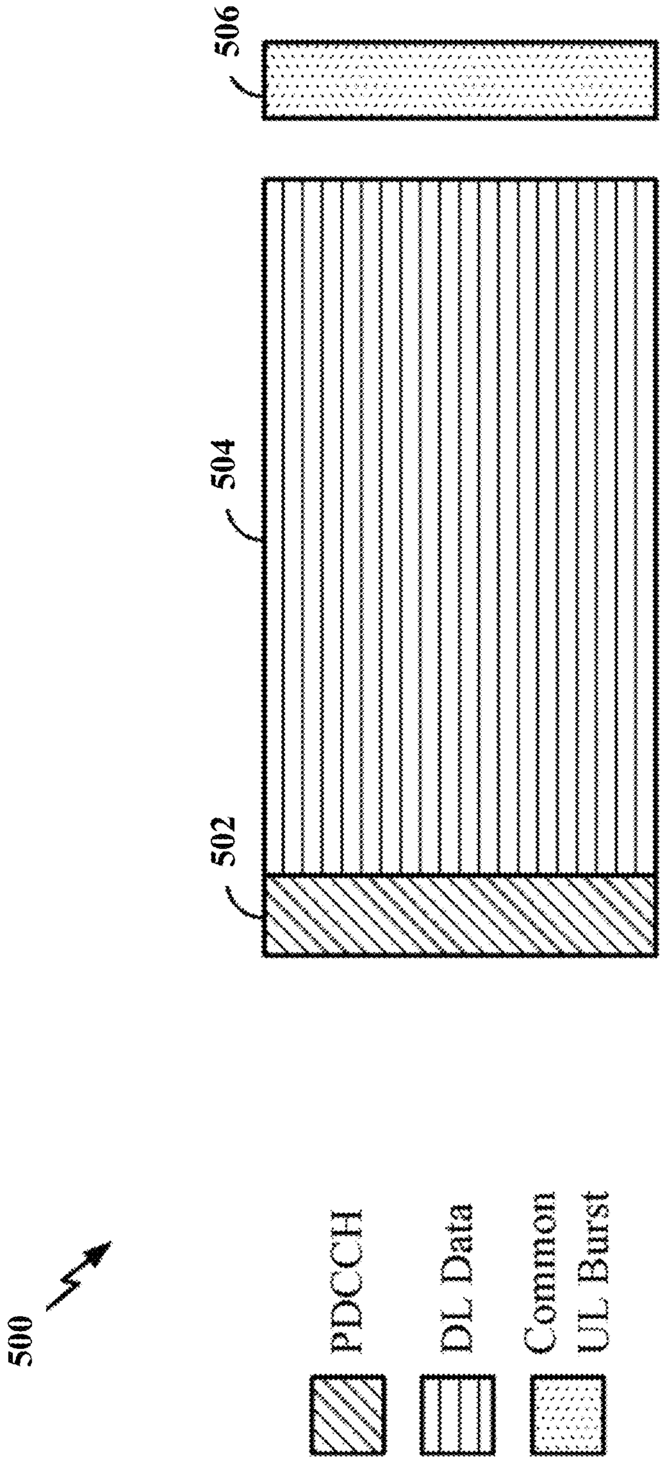
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH)

procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
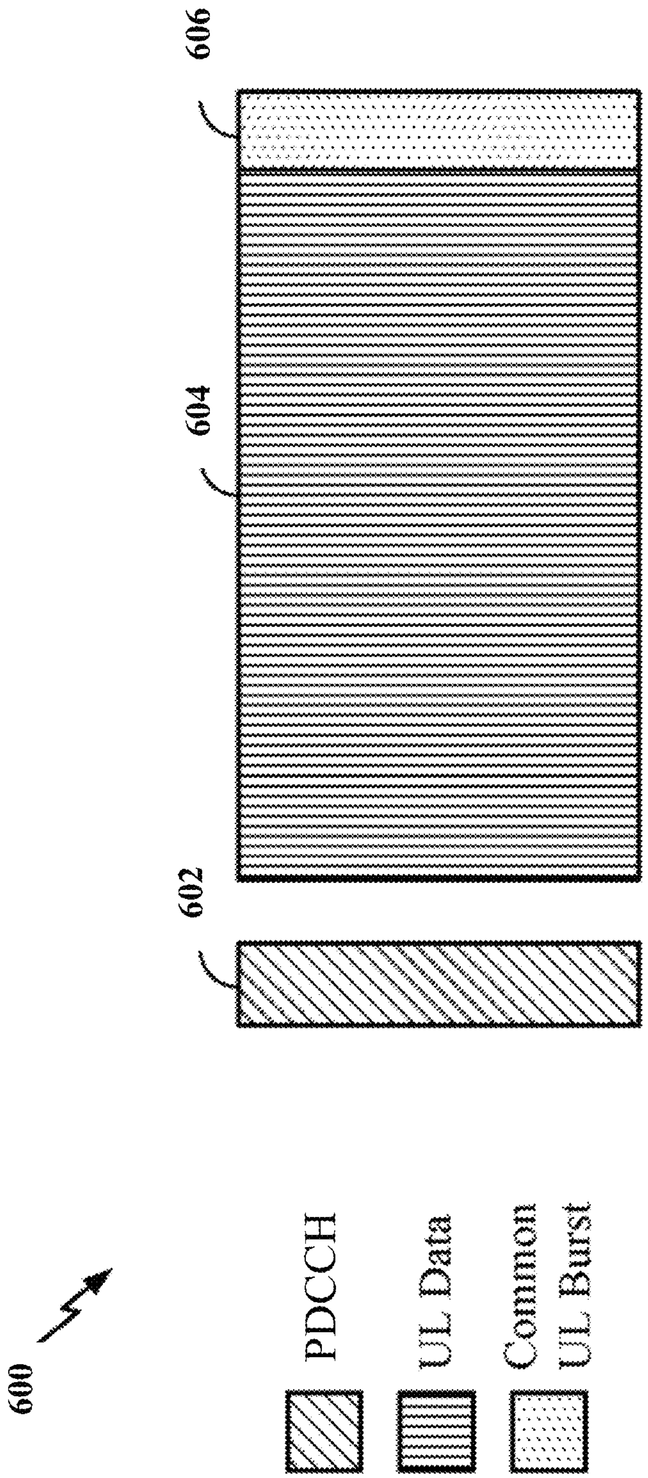
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

"Subnetworking" is one of the emerging major topics. The 6G radio access technology is expected to support extreme communication requirements in terms of throughput, latency, and reliability. Subnetworking is identified in recent 6G overview literature among a plethora of unique technologies for the support of the demanding 6G services. The main objectives of deploying subnetworks include offloading most demanding services from the classical macro networks, to support extreme performance requirements at any suitable location and at any time. This is important, as it is expected to have increasingly much more demanding future services, which require offloading of the most constraining functions/services from some user devices to their neighboring devices, in addition to the classical macro networks (i.e., edge computing).

Noticeably, the state-of-the-art network resource sharing and computation offloading systems including 4G and 5G networking technologies, has the following limitations. (1) One requires service provisioning by the network operators: Applications or Services that may use distributed compute resources must be pre-provisioned by the network operator. Consequently, the (new) applications/services that are not pre-provisioned cannot use distributed resources. (2) The scope of the service-based architecture (SBA) in 5G is limited to the Core Network (CN) domain. It does not extend to the Radio Access Network (RAN) domain and does not include the user device domain. Thus, Virtual Network Function (VNF) distribution to the end-devices is limited. (3) To use the compute resource sharing, any user device must be subscribed to a network operator and must be connected to the operator's network. Thus, the non-registered user devices cannot use the compute resource sharing. Providing compute resource sharing to the subscribed user devices is simpler to manage by the network operators in terms of network security. However, considering the sheer increase of the number of user devices that may not require direct connectivity to an operator's network to be operational (e.g., wearables, ambient devices, IoT sensors), extending the compute resource sharing to unsubscribed user devices promises new business opportunities and potential new revenue streams (e.g., possibility to opt in compute resource sharing services subject to some attractive incentive-based policies). The network security concerns related to unsubscribed user devices may be eliminated/alleviated with various network virtualization and isolation methods, which detect the malicious software and prevent its propagation deeper into the network.

Hence, there is a need for a flexible subnetwork architecture and communication/compute protocols that enable compute resource sharing and network connectivity resource sharing while involving both non-registered user devices and operator networks.

One aspect of the disclosure relates to a device compute orchestration mechanism, together with a functional architecture for user centric communication and compute applications, which may extend the SBA to user devices, as well as a distributed device cloud function (DDCF), its role, and how it fits within the protocol stack of user devices and network nodes.

In the disclosure as follows, the terms "subnetwork," "user device centric network" and "device cloud" may be interchangeably used, although, generally speaking, subnetworks are a part of the scope of the user device centric networks and device cloud. The device cloud is a dynamic cluster of nodes built around a user device, which may include other user devices and/or network nodes working together to execute a software task, such as a distributed module of an application or a service running on the said user device. Hence, in a general sense, the dynamicity of the cluster defining the device cloud is determined by a given application, i.e., the device cloud can change in topology/configuration and nodes composition from application to application. The subnetwork is a network that connects user devices and/or other end-devices, such as unmanned devices or IoT devices.

Figure 7:
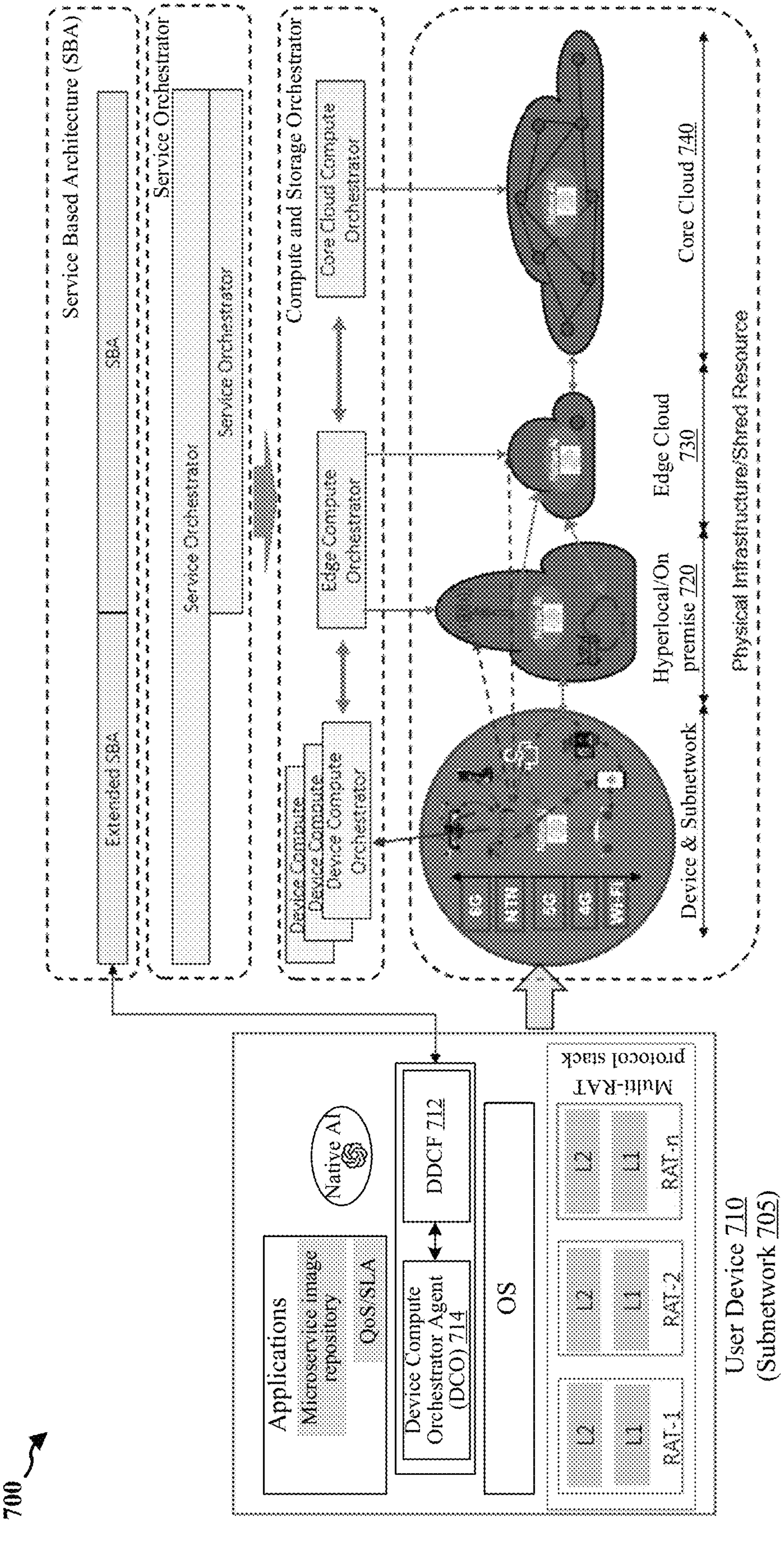
FIG. 7 is a diagram illustrating a user centric network architecture and computer resource orchestrators.

FIG. 7 is a diagram illustrating a user centric network architecture and computer resource orchestrators. As shown in FIG. 7, the architecture 700 includes a core cloud 740, an edge cloud 730, a hyperlocal/on premise cloud 720 (e.g., a base station (BS), an access point (AP), and/or a gateway (GW)), and devices and subnetworks. Specifically, the term "device" herein refers to any device or system that is connected to a network, which may be a user device or a network node. In the architecture 700, a user device 710 (which is defined as an end user device or a peripheral device, such as a smartphone or a smart glass) may support multi-RATs, such as 6G, 5G NR, LTE, Wi-Fi, and Bluetooth. Examples of the user device 710 may include, without being limited to, an IoT device, a camera, a drone, a smartphone, a smart glass, a smart watch, or other types of user devices. In certain embodiments, the user device 710 may be in a subnetwork 705, which is formed by the user device 710 and/or other devices (e.g., other user devices and/or network devices).

As shown in FIG. 7, the user device 710 is provided with a distributed device cloud function (DDCF) 712, which is a device cloud/user centric network management module in the user device/UE 710 that handles the communication with other neighboring devices via the underlying access technologies. Unlike the typical cloud orchestration or network orchestration, the user device 710 autonomously manages its own compute orchestrator, which is herein named a "device compute orchestrator" (DCO) 714, that can operate independently without being connected to the operator's network. Specifically, the user device 710 includes both the DDCF 712 and the DCO 714 to enable the DDCF operation without being connected to an overlay network. To increase the scalability of supported applications which use the compute resource sharing service (often referred as Compute as a Service (CaaS)), any application relying on CaaS and containing the necessary microservice images may use the device (which may be any device or system that is connected to a network, such as a user device or a network node) and network compute resource sharing service without being provisioned in the operators' network. The necessary microservice images may also be located in a network repository with network connectivity requirement. It is recommended to define the QoS information for the application and microservices that will be used so that one can identify/find the appropriate amount of device/network resources. If this information is not provided, then a default configuration could be used.

When a device (e.g., the user device 710) is connected to the network and a pre-provisioned service is instantiated, the compute orchestrator of the edge cloud 730 and the compute orchestrator of the core cloud 740 under the service orchestrator support the (user) device in a traditional manner. In addition to the network centric service, a compute resource sharing service provided by a user device centric network (or a device cloud) enables the hyper-local, edge and core clouds to actively provide the necessary network capabilities information to the connected user device 710. The (user) device compute orchestrators and the device cloud network management modules may become a part of an extended SBA of the network operator, and may be managed by the operator, providing the connected user device is subscribed to the network operator. In this way, a connected (user) device can forward the retrieved capabilities information (or received messages) from the overlay network to other (user) devices in the user device centric network which are not directly connected to the overlay network. On the other hand, an unsubscribed user device, which is not directly connected to the overlay network, may be clustered in the subnetwork, such that the subscribed user device may forward the capabilities information, and the unsubscribed user device may receive the capabilities information forwarded by the subscribed user device, and vice versa.

As an example, the smartGlass runs its own DCO (shown in the solid arrow) and uses compute resources from the smartphone device, hyper-local (on premise) cloud and edge cloud (shown in the dotted arrows) in FIG. 7. A device centric network could be connected to multiple operator networks at the same time, but the description in the embodiments uses a single operator case for simplicity.

Figure 8:
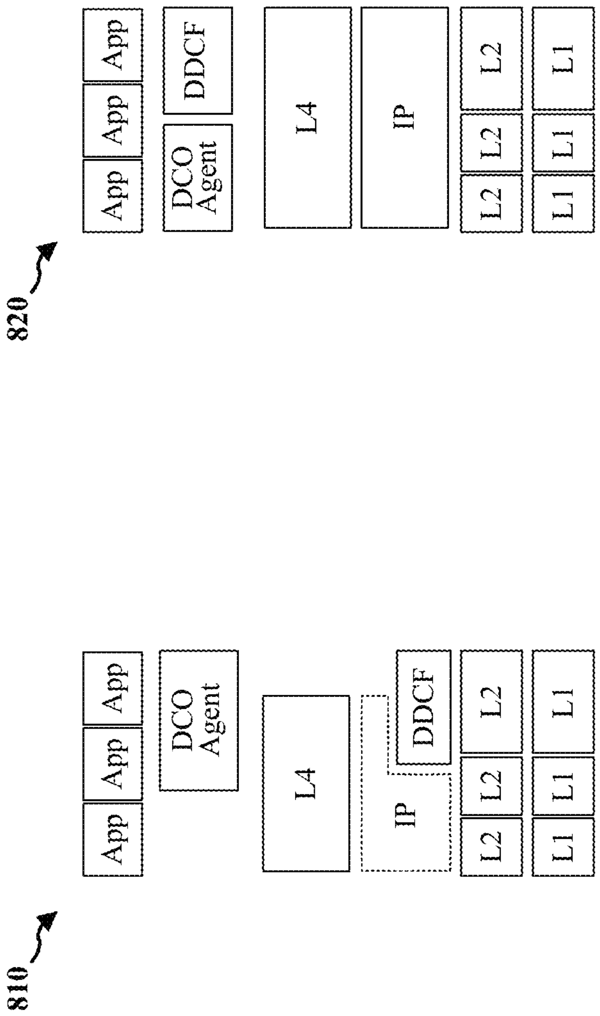
FIG. 8 is a diagram illustrating formations of a user device.

FIG. 8 is a diagram illustrating formations of a user device. In certain embodiments, the DDCF could be placed below or above the network layer (e.g., the IP layer, Layer 3 or L3), depending on the connectivity mechanisms between user devices or whether the network layer (e.g., the IP layer) is supported by user devices. As shown in FIG. 8, the user device may include two different formations. For example, in one embodiment, the user device 810 is formed such that the DDCF of the user device 810 is placed below the IP layer and above the data link layer (Layer 2 or L2). Specifically, when a direct Layer 2 or a Local Area Network (LAN) type of connectivity is supported by the user device 810, the DDCF may be placed below the IP layer and directly above the data link layer. In this case, when the DDCF generates a DDCF message, the DDCF may receive an IP packet from the IP layer and encapsulate the IP packet to form the DDCF message. Alternatively, the DDCF may directly generate the DDCF message without receiving the IP packet. In an alternative embodiment, when the user device 810 does not support the IP layer (i.e., the user device 810 is without the IP layer), the DDCF may be placed directly above the data link layer (L2).

In another embodiment, the user device 820 is formed such that the DDCF of the user device 820 is placed above the IP layer. Specifically, if the RATs of the user device 820 support IP connectivity establishment between user devices, the DDCF may be placed above the IP layer. In particular, the DDCF of the user device 820 is placed above the transport layer (i.e., Layer 4 or L4) and at the application layer. In this case, when the DDCF generates a DDCF message, the DDCF message may be sent through the IP layer and encapsulated in an IP packet. The DDCF may also be required to identify a destination layer of the DDCF message with a transport layer port number.

In certain embodiments, the user device 810/820 may be used in a device cloud protocol architecture with an end-to-end protocol stacks supporting remote compute resource sharing over a device cloud, in which the compute resources may stretch across devices (e.g., user devices) in the subnetwork, hyperlocal cloud, edge cloud and core cloud.

Figure 9:
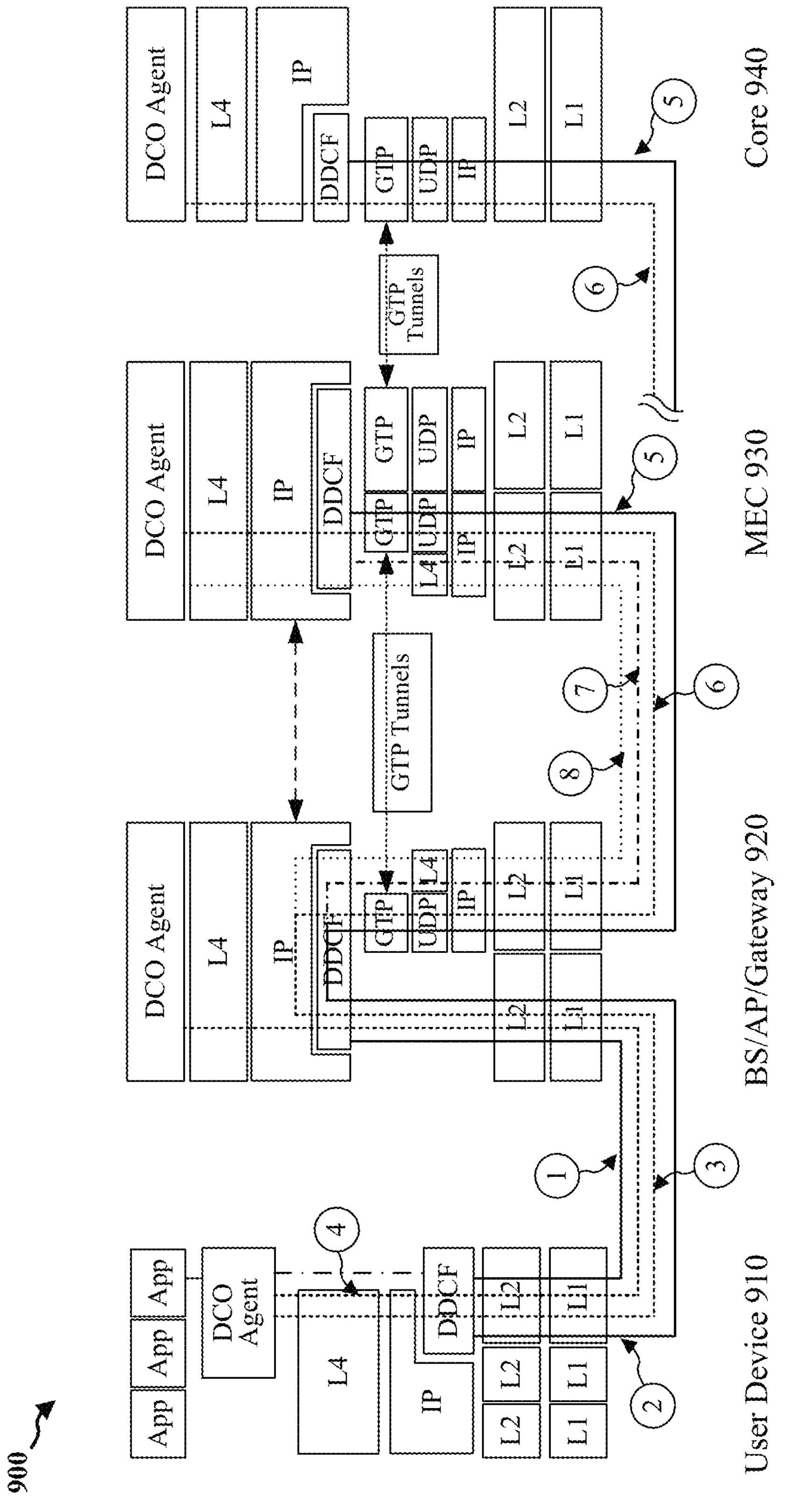
FIG. 9 is a diagram illustrating a device cloud protocol architecture, with the DDCF of the user device above the L2 layer and below the IP layer.
Figure 10:
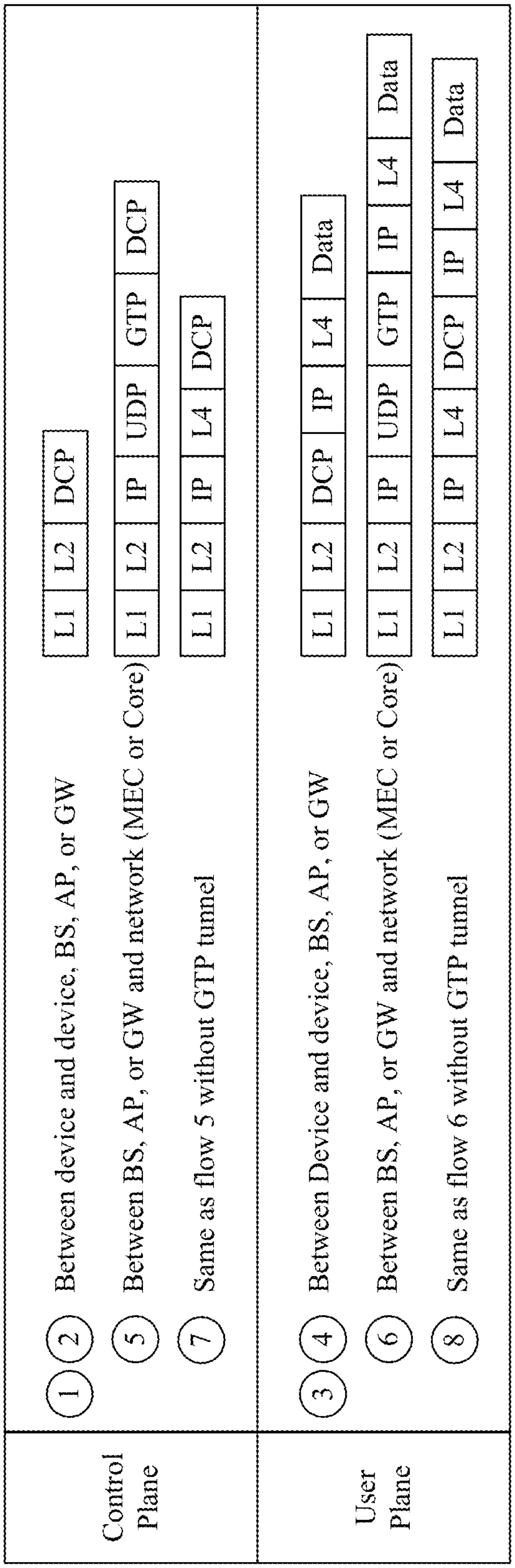
FIG. 10 is a diagram illustrating protocol headers of the exemplary traffic flows in FIG. 9.

FIG. 9 is a diagram illustrating a device cloud protocol architecture, with the DDCF of the user device above the L2 layer and below the IP layer, and FIG. 10 is a diagram illustrating protocol headers of the exemplary traffic flows in FIG. 9. For simplicity, in the architecture 900 as shown in FIG. 9, a single user device 910 is shown, which is a subscriber of the network. The user device 910 has a similar structure to the user device 810, with the DDCF being placed above the L2 layer and below the IP layer. In certain embodiments, the user device 910 may include the DDCF by default. Alternatively, the DDCF may be instantiated by the network in the user device 910, providing the network supports remote compute resource sharing services to all user devices via the subnetwork and the user device 910 is a subscriber device. In the user device 910, the DDCF works as a control plane (or management module) for the subnetworking operations, and it also works as a protocol layer that generates device cloud packets or encapsulate/decapsulate the packets passing through the DDCF. In one embodiment, as shown in FIG. 9, when the DDCF is placed below the IP layer, the DDCF may be placed right above the L2 layer for describing the IP tunnel-based device cloud protocol architecture.

Figure 11:
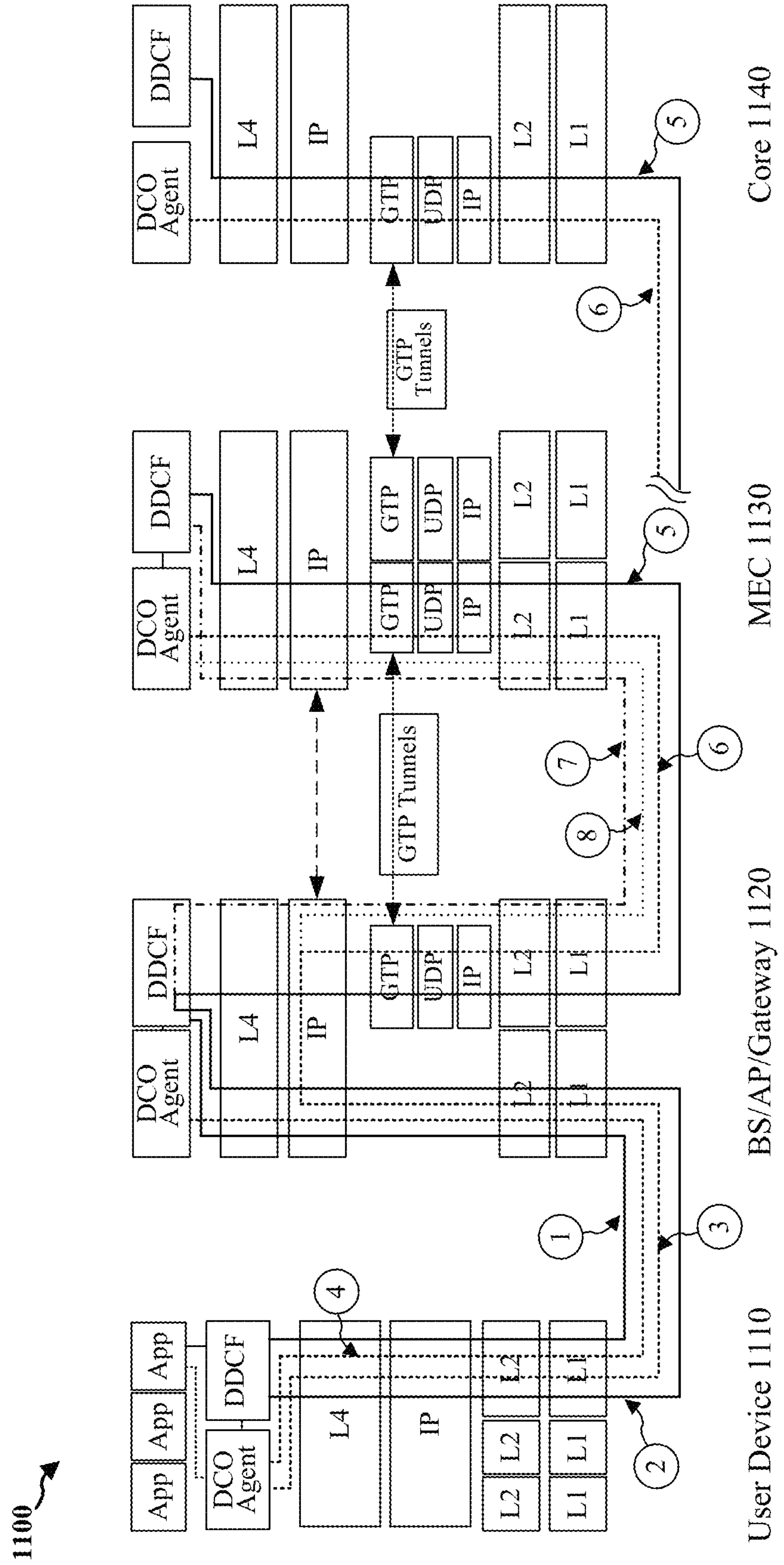
FIG. 11 is a diagram illustrating a device cloud protocol architecture, with the DDCF of the user device above the IP layer.
Figure 12:
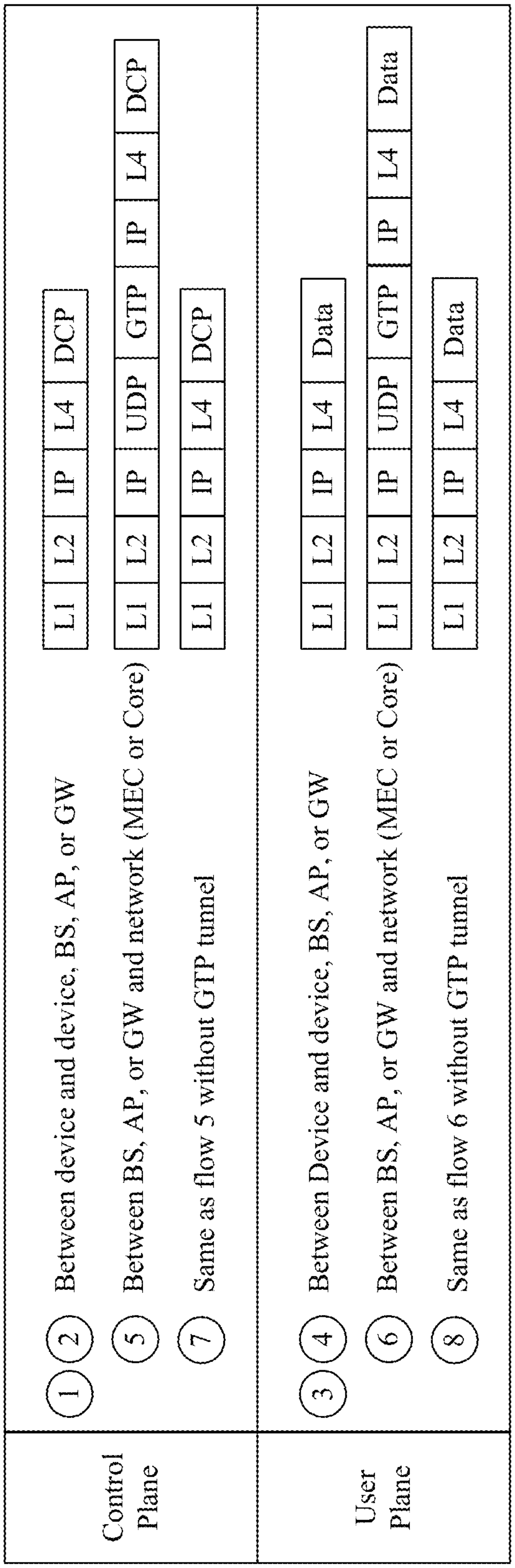
FIG. 12 is a diagram illustrating protocol headers of the exemplary traffic flows in FIG. 11.

FIG. 11 is a diagram illustrating a device cloud protocol architecture, with the DDCF of the user device above the IP layer, and FIG. 12 is a diagram illustrating protocol headers of the exemplary traffic flows in FIG. 11. For simplicity, in the architecture 1100 as shown in FIG. 10, a single user device 1110 is shown, which is a subscriber of the network. The user device 1110 has a similar structure to the user device 820, with the DDCF being placed above the IP layer. In particular, the DDCF of the user device 1110 is placed above the transport layer (L4), or more precisely, at the application layer.

The exemplary traffic flows as shown in FIG. 9 and FIG. 11 are described as follows. Using the architecture 900 in FIG. 9 as an example, during this phase, a service bearer needs to be created between a "renter," which refers to the entity lending compute resources, e.g., the BS 920, the Multi-Access Edge Computing (MEC) 930 or the Core 940, and the proxy device (e.g., the user device 910), which is referred as a "tenant" (i.e., the entity borrowing compute resources). Intermediate GTP or IP tunnels may need to be established (e.g., between BS/AP/GW 920 and the renter in the edge cloud 930, and between BS/AP/GW 920 and the renter in the core cloud 940). These network tunnels are transparent to the user device 910. The mapping mechanism between the service bearers and the network tunnels is specific to the operator network. In certain configurations, if the renter is reachable with the renter IP address from the BS/AP/GW 920, then the renter IP address could be proxied at the BS/AP/GW 920, instead of establishing network tunnels. In this case, the DDCF could be placed above the L4 protocol layer in the network nodes (i.e., using the architecture 1100 as shown in FIG. 11). However, the protocol stack in the BS/AP/GW may require a more sophisticated implementation, if the DDCF towards the air interface needs to be placed below the IP layer, as shown in FIG. 9.

In the architecture 900/1100, prior to running microservices in a renter (e.g., remote user devices or network nodes), the tenant device (e.g., the user device 910/1110) must discover by sending requests: (i) which neighboring devices and/or network nodes may share compute resources, (ii) renter capability, (iii) renter id, and (iv) renter IP address. In this case, the tenant device informs the amount of compute resources required, and establishes a device cloud frame switching/forwarding (switching and forwarding are used interchangeably) table after receiving responses.

The device cloud message exchange during this phase is done via device cloud control plane and the exemplary traffic flows are labeled as (1), (2), (5) and (7) in FIG. 9 and FIG. 11, and the corresponding protocol headers are shown in FIG. 10 and FIG. 12. The flows (1) and (2) are between the DDCF in the user device 910/1110 and the DDCF in the BS/AP/GW 920/1120, which is one airlink hop away, while the flows (5) and (7) are between the DDCF in the BS/AP/GW 920/1120 and the DDCF in the edge cloud 930/1130.

A direct device-to-device (D2D) control plane communication between DDCFs over the air interface (flows (1) and (2)) is a point-to-point communication. If a LAN type of connectivity between user devices is supported and the DDCF is placed above the L2 layer as shown in FIG. 9, the communication between DDCFs does not need to involve the IP layer, and traffic forwarding via intermediate user devices may be done via the device cloud frame switching/forwarding mechanism in the DDCF. Every DDCF of a device (e.g., the user device 910/1110) that belongs to a subnetwork maintains a device cloud frame switching/forwarding table that includes information of other neighboring devices in the same subnetwork (e.g., device ID of a destination device, IP addresses of the destination user device(s) and network node(s), output RAT ports, and next hop (user) device or network node IDs in the transmission path to the destination device).

If IP connectivity between user devices is supported and the DDCF is placed above the IP layer as shown in FIG. 11, a DDCF message is encapsulated into an IP packet. In this architecture 1100, the traffic forwarding/switching can be done by using the device cloud frame switching/forwarding table similar to the description from above, with the exception of an additional parameter, namely a transport layer port number, which is used to identify the destination layer (i.e., the transport layer). The communication between user devices may also use an IP tunneling mechanism.

The DDCF control plane message beyond the base station 920/1120, as shown by flows (5), (7), (6) and (8) in FIG. 9 and FIG. 11, however, always needs to travel along the IP network layer for accessing the network nodes in the edge/core clouds. During this phase, a service bearer needs to be created between the renter and the proxy (user) device (the tenant user device 910/1110), and intermediate GTP or IP tunnels may be established for this purpose, providing two end points are not initially known to each other (flows (5) and (6)). Otherwise, native IP communications may be used (flows (7) and (8)). The network tunnels are transparent to tenant (user) devices. The mapping mechanism between the service bearers and network tunnels is specific to the operator network. A GTP tunnel is used as an exemplary embodiment in the architecture 900/1100, but other tunneling mechanisms could be used. Alternatively, tunneling may be simply omitted providing that the end points are directly reachable.

Once neighboring user devices and/or network nodes (BS 920/1120, MEC 930/1130 and Core 940/1140) are identified as renter entities, the orchestrator in the tenant device (e.g., the user device 910/1110) works together with the orchestrator agent modules in the identified renter entities, and the communication between the renter entities in the orchestration cluster is established via TCP/UDP over IP.

In particular, the flow (4) is between the orchestrator agent of the user device 910/1110 and the orchestrator agent of the BS/AP/GW 920/1120. The flow (3) starts from the orchestrator agent of the user device 910/1110, goes through the DDCF/IP layer (for the architecture 900 in FIG. 9) or through the IP layer (for the architecture 1100 in FIG. 11) of the BS/AP/GW 920/1120 (but does not reach into the orchestrator agent of the BS/AP/GW 920/1120), and transforms into the flow (6) onwards to the edge cloud 930/1130 (reaching into its orchestrator agent) and to the core cloud 940/1140 (reaching into its orchestrator agent). The flow (2) between the DDCF of the user device 910/1110 and the DDCF of the BS/AP/GW 920/1120 transforms into flow (5) onwards to the network elements and bridges the communication between the respective DDCFs (see FIG. 9 and FIG.

11). The flows (5) and (6) from the core cloud 940/1140 are not extended to the user device to simplify FIG. 9 and FIG. 11.

In addition to the protocol architecture for the device cloud, a method is proposed to integrate the DDCF (device cloud protocol layer) in the user devices and network nodes when the architecture 900 in FIG. 9 is used. If the architecture 1100 in FIG. 11 is used, then both the orchestrator agent and the DDCF are software modules deployed on the application layer. Such an embodiment does not require a special integration in the protocol stack because the DDCF traffic is treated as an application traffic session (see FIG. 14 below). The DDCF integration corresponding to the architecture 900 is described in further details as follows.

Figure 13:
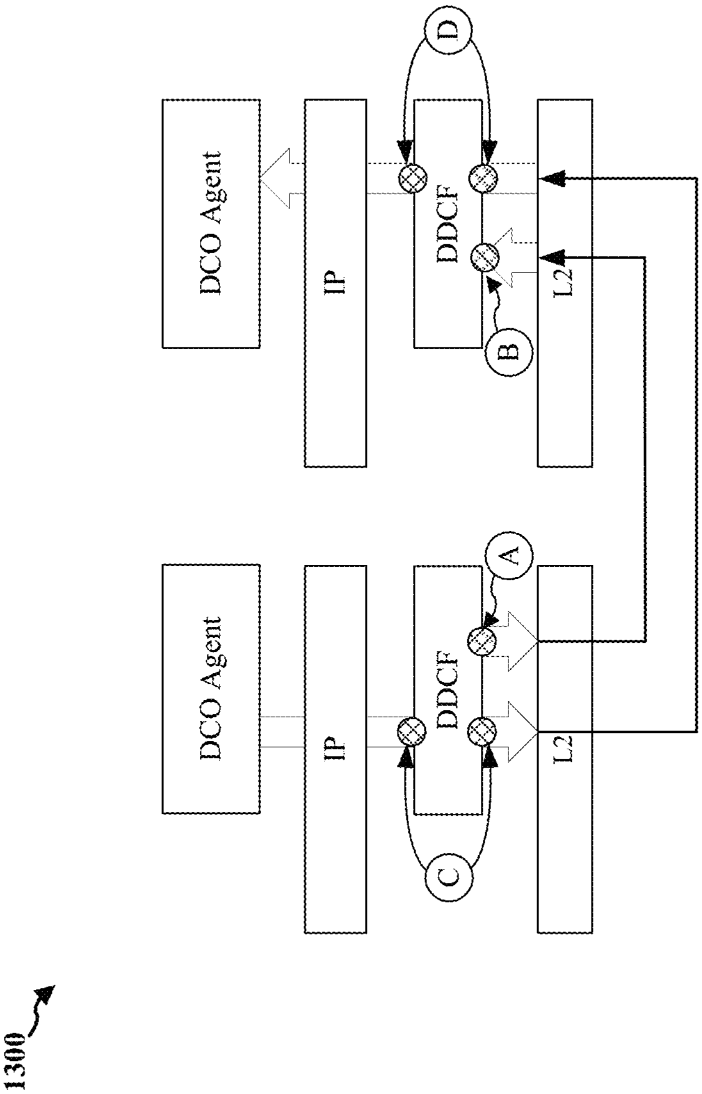
FIG. 13 is a diagram illustrating the DDCF and the DCO, where the DDCF is above the L2 layer.

FIG. 13 is a diagram illustrating the DDCF and the DCO, where the DDCF is above the L2 layer. Specifically, FIG. 13 shows that the DDCF, which generates device cloud packets (including device cloud message headers), is placed in between the IP layer and the L2 layer. At the transmitter side (left side of FIG. 13), the DDCF may transmit a DDCF message (e.g., in the form of DDCF packets) in two ways: (1) transmitting each DDCF packet initiated by the DDCF itself, which is marked as (A) in FIG. 13; and (2) encapsulating an IP packet in the DDCF packet, which is marked as (C) in FIG. 13.

In certain configurations, if an IP packet needs to be handled by the DDCF, there are three methods to deliver the IP packet to the DDCF. The first method includes applying a dynamic binding between the upper layer (e.g., above L4 layer) and the DDCF prior to starting the message exchange. Specifically, the dynamic binding involves dynamically assigning a transport layer (L4) port number to the DDCF. Without such a binding (i.e., an IP packet not using the transport layer port number assigned to the DDCF), the IP packet passes (transparently) through the DDCF. The second method includes configuring a specific transport layer port number (which is fixed) for the DDCF, either through local port configuration or by reserving a port number. The second option (reserving a specific transport layer port number) requires standardizing the port for this purpose. The packets containing a port number other than the DDCF specific port number pass through the DDCF transparently.

The third method includes adding an indicator in the IP header. The IP header contains several reserved bits in the "Type of Service" field and in the "Flags" field. Even though these are reserved bits for future use and are specified to be set to zero while reserved, routers typically do not drop packets merely because one or more of these reserved bits has/have a non-zero value. Instead, routers ignore these fields, and the packets pass through, without altering the values of these reserved bits. Furthermore, if a router fragments a packet, it copies these bits into each fragment of the packet. Thus, this method is robust and works in practical routing implementations. However, it is not guaranteed that all routers or IP protocol implementations may work as expected. Therefore, the IP optional header fields could be used to ensure high reliability of the DDCF. For these reasons, the method adopts a mechanism to standardize an IP option for supporting device cloud operations in future 6G communications.

Figure 14:
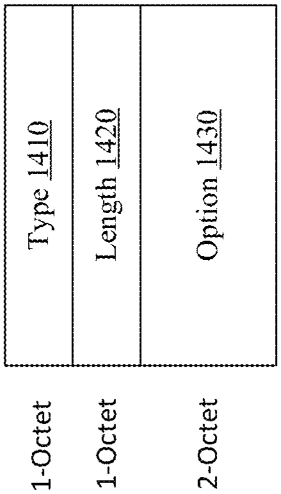
FIG. 14 is a diagram illustrating a part of the IP header.

FIG. 14 is a diagram illustrating a part of the IP header. Specifically, the IP header options are identified by the option type field. The options have their 1-octet type field 1410 (mandatory), followed by a 1-octet length field 1420 (optional), followed by a 2-octet option data field 1430 (optional). The option type field 1410 is sub-divided into a one-bit copied flag, a two-bit class field, and a five-bit option number. These, taken together, form an eight-bit value for the option type field 1410. IP options are commonly referred to by this value. Since the purpose of the additional information in the IP header is to request DDCF service, the new IP header option only needs 1-byte option type field 1410, and the option length and option data fields 1420 and 1430 are not necessary.

Referring back to FIG. 13, at the receiver side (right side of FIG. 13), after the L2 layer processing, when a packet is received, the first 1-byte of the header field of the packet is checked to identify whether it is an IP packet or a device cloud packet. If the packet is an IP packet, the DDCF allows the packet to transparently passes through the DDCF to reach the IP layer, which is marked as "D" in FIG. 13. In other words, when the DDCF detects an IP packet or a message for an upper layer, the DDCF delivers the IP packet to the upper layer accordingly. If the packet is not an IP packet, the packet stops at the DDCF to be processed by the DDCF, and the DDCF checks the second 1-byte header field to identify the type of protocols (e.g., subnetwork, personal IoT network, etc), which is marked as "B" in FIG. 13.

The most significant bit of the "Protocol Version" field in the device cloud packet may be set to serve as an identifier for a non-IP packet. This is because the smallest value in the device cloud packet header protocol version field is 8, but there are only two versions in practical implementations of the IPv4 and IPv6 protocol header Version field, which are 4 and 6.

Figure 15:
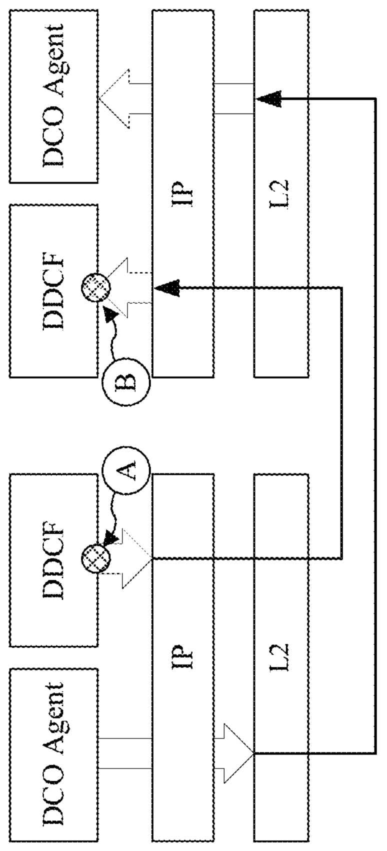
FIG. 15 is a diagram illustrating the DDCF and the DCO, where the DDCF is above the IP layer.

FIG. 15 is a diagram illustrating the DDCF and the DCO, where the DDCF is above the IP layer. Comparing the data flow in FIG. 15 to the data flow in FIG. 13, the data flows in FIG. 15 includes only flows (A) and (B), as all DDCF packets pass through the IP layer and are encapsulated in IP packets. Thus, there will be no IP packet to be handled by the DDCF, and the methods applied to the data flows in FIG. 13 do not apply.

Figure 16:
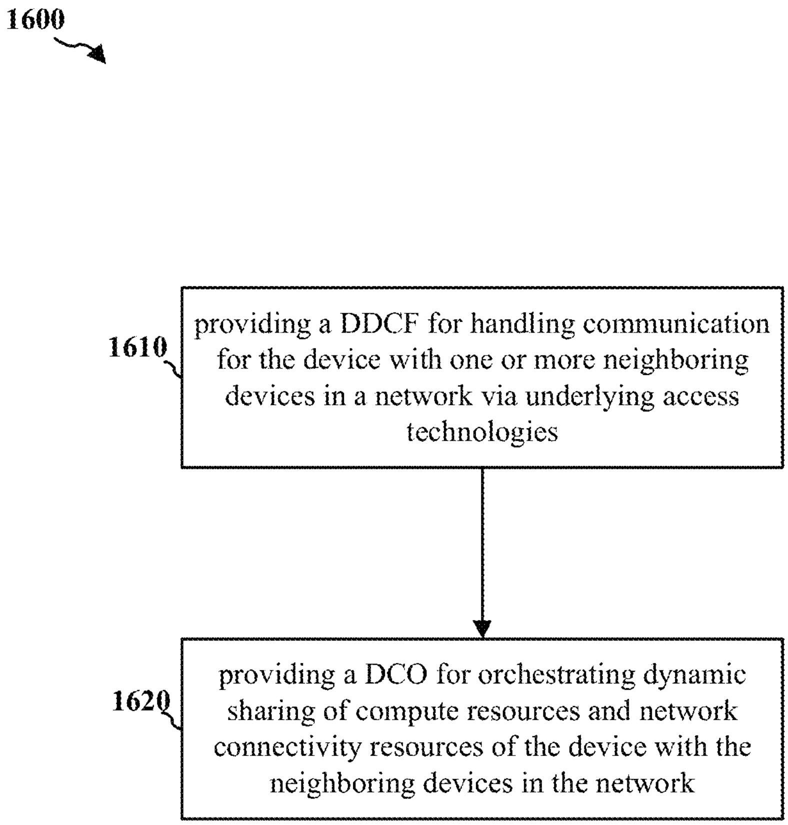
FIG. 16 is a flow chart of a method (process) for wireless communication of a device.

FIG. 16 is a flow chart of a method (process) for wireless communication of a device. The method may be performed by a device (e.g., the user device 810/820, 910/1110, or other devices such as a network node). At operation 1610, the device provides a DDCF for handling communication for the device with one or more neighboring devices in a network via underlying access technologies. At operation 1620, the device provides a device compute orchestrator (DCO) for orchestrating dynamic sharing of compute resources and network connectivity resources of the device with the neighboring devices in the network. The DDCF is operable when the device is connected to the network or not connected to the network. The DCO is placed above a transport layer of the device.

In certain embodiments, the device is a subscribed user device subscribed to a network operator. The subscribed user device that is connected to the network operator's network allows dynamic sharing of compute resources and network connectivity resources of one or more network devices of the network with unsubscribed neighboring devices through the subscribed user device. The DDCF is configured as a part of an extended SBA and managed by the operator device.

In one embodiment, the device further forwards, by the DDCF, capabilities information from the network operator to one of the neighboring devices in a subnetwork that is not directly connected to the network.

In one embodiment, the dynamic sharing of the compute resources run across devices in a subnetwork, a hyperlocal cloud, an edge cloud and a core cloud of the network.

In one embodiment, the device further receives, from the network operator, an instruction to instantiate or reconfigure the DDCF.

In certain embodiments, the device is an unsubscribed user device not subscribed to a network operator, and the unsubscribed device is connected to the network operator through a subscribed device in a subnetwork. In one embodiment, the device further receives, by the DDCF, capabilities information of one or more network devices from the subscribed device.

In certain embodiments, the device is a user device or a network device, and the DDCF includes a device cloud frame switching/forwarding table storing information of devices in a subnetwork. In one embodiment, the information of each device in the subnetwork includes: a device ID of each device, a device network address of each device, an output RAT port, and a next hop user device ID or a next hop network device ID to reach a destination device.

In one embodiment, the device further transmits, by the DDCF, a DDCF message to a destination device. The DDCF is configured to identify, from the devices in the subnetwork, the destination device with a device UUID and the MAC address according to the information stored in the device cloud frame switching/forwarding table.

In one embodiment, communication between the user device or the network device and one of the devices in the subnetwork is a D2D communication or is a communication forwarded by an AP or a base station.

In certain embodiments, the DDCF is configured to function as a control plane/management module for device cloud network operation, and as a protocol layer generating device cloud packets and encapsulating or decapsulating the packets passing through the DDCF.

In certain embodiments, the DDCF is placed below a network layer (L3). In one embodiment, the DDCF is configured to generate a DDCF message by: receiving a network packet from the network layer, and encapsulating the network packet to form the DDCF message (where the network packet in the DDCF message is intended to be transmitted through the DDCF at the destination device); or generating the DDCF message without receiving the network packet, wherein the DDCF message is intended to be handled by the DDCF at the destination device).

In one embodiment, the device is a user device, LAN connectivity between the user device and the neighboring devices is supported, and the DDCF is placed above a data link layer (L2), network connectivity between the user device and the neighboring devices is supported, and communication between the DDCF of the user device and the neighboring devices does not involve the network layer.

In one embodiment, the device further receives, by the DDCF, a packet from one of the neighboring device. The device determines, by the DDCF, whether the packet received is a network packet or a device cloud packet. In response to determining the packet received to be the network packet, the device allows the network packet to transparently pass through the DDCF and reach an upper layer. In response to determining the packet received to be the device cloud packet, the device processes, by the DDCF, the device cloud packet.

In one embodiment, the device applies a dynamic binding (i.e., dynamically assigning a transport layer port number) between the upper layer and the DDCF to indicate the destination layer of the packet. Alternatively, the device configures a fixed transport layer port number (through local port configuration or by reserving a corresponding port number, which requires to standardize the port) for the DDCF to indicate the destination layer. Alternatively, the device uses an indicator in a header of the packet to indicate the destination layer.

In certain embodiments, the DDCF is placed above a network layer, and network connectivity between the device and the neighboring devices is supported. In one embodiment, the DDCF message is encapsulated in a network packet, and the DDCF is further configured to identify a destination layer of the DDCF message with a transport layer port number.

In certain embodiments, the device is without a network layer (L3), and the DDCF is placed above a data link layer (L2).

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. Combinations such as “at least one of A, B, or C,” “one or more of A, B, or C,” “at least one of A, B, and C,” “one or more of A, B, and C,” and “A, B, C, or any combination thereof” include any combination of A, B, and/or C, and may include multiples of A, multiples of B, or multiples of C. Specifically, combinations such as “at least one of A, B, or C,” “one or more of A, B, or C,” “at least one of A, B, and C,” “one or more of A, B, and C,” and “A, B, C, or any combination thereof” may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.”

What is claimed is:

1. A method of wireless communication of a device, comprising:

handling, by a distributed device cloud function (DDCF) of the device, communication for the device with one or more neighboring devices in a subnetwork via underlying access technologies; and orchestrating, by a device compute orchestrator (DCO) of the device, dynamic sharing of compute resources and network connectivity resources of the device with the neighboring devices in the subnetwork, wherein the orchestrating comprises the device borrowing compute resources from at least one of the one or more neighboring devices, wherein the DDCF and the DCO are operable to enable the handling of communication and the orchestrating of dynamic sharing within the subnetwork regardless of whether the device is connected to an overlay network, wherein the DCO is placed above a transport layer of the device, wherein the device autonomously manages the DCO independently without being connected to an operator's network, wherein the DDCF works as a control plane for subnetworking operations and as a protocol layer that generates device cloud packets or encapsulates/decapsulates packets passing through the DDCF, and wherein the orchestrating further comprises, prior to running microservices in the at least one of the one or more neighboring devices, discovering the at least one of the one or more neighboring devices by sending resource discovery requests and establishing a device cloud frame switching/forwarding table based on responses from the one or more neighboring devices.

2. The method of claim 1, wherein the device is a subscribed user device subscribed to a network operator, and the method further comprises:

allowing dynamic sharing of compute resources and network connectivity resources of one or more network devices of the overlay network with unsubscribed neighboring devices through the subscribed user device connected to the overlay network, wherein the DDCF is configured as a part of an extended service based architecture (SBA) and managed by the network operator.

3. The method of claim 2, further comprising:

forwarding, by the DDCF, capabilities information from the network operator to one of the neighboring devices in the subnetwork that is not directly connected to the overlay network.

4. The method of claim 2, wherein the dynamic sharing of the compute resources run across devices in the subnetwork, a hyperlocal cloud, an edge cloud and a core cloud of the overlay network.

5. The method of claim 2, further comprising:

receiving, from the network operator, an instruction to instantiate or reconfigure the DDCF.

6. The method of claim 1, wherein the device is an unsubscribed user device not subscribed to a network operator, and the unsubscribed user device is connected to the overlay network through a subscribed device in the subnetwork.

7. The method of claim 6, further comprising:

receiving, by the DDCF, capabilities information of one or more network devices from the subscribed device.

8. The method of claim 1, wherein the device is a user device or a network device, and the DDCF includes a device cloud frame switching/forwarding table storing information of devices in the subnetwork.

9. The method of claim 8, wherein the information of each device in the subnetwork includes:

a device identifier (ID) of each device, a device network address of each device, an output radio access technology (RAT) port, and a next hop user device ID or a next hop network device ID to reach a destination device.

10. The method of claim 8, further comprising:

transmitting, by the DDCF, a DDCF message to a destination device, wherein the DDCF is configured to identify, from the devices in the subnetwork, the destination device with a device Universally Unique Identifier (UUID) and the media access control (MAC) address according to the information stored in the device cloud frame switching/forwarding table.

11. The method of claim 8, wherein communication between the user device or the network device and one of the devices in the subnetwork is a device-to-device (D2D) communication or is a communication forwarded by an access point (AP) or a base station.

12. The method of claim 1, wherein the DDCF is configured to function as a control plane/management module for device cloud network operation, and as a protocol layer generating device cloud packets and encapsulating or decapsulating the packets passing through the DDCF.

13. The method of claim 1, wherein the DDCF is placed below a network layer.

14. The method of claim 13, wherein the DDCF is configured to generate a DDCF message by:

receiving a network packet from the network layer, and encapsulating the network packet to form the DDCF message; or generating the DDCF message without receiving the network packet, wherein the DDCF message is intended to end at the DDCF at the destination device.

15. The method of claim 13, wherein the device is a user device, local area network (LAN) connectivity between the user device and the neighboring devices is supported, and the DDCF is placed above a data link layer, network connectivity between the user device and the neighboring devices is supported, and communication between the DDCF of the user device and the neighboring devices does not involve the network layer.

16. The method of claim 13, further comprising:

receiving, by the DDCF, a packet from one of the neighboring devices;

determining, by the DDCF, whether the packet received is a network packet or a device cloud packet;

in response to determining the packet received to be the network packet, allowing the network packet to transparently pass through the DDCF and reach an upper layer; and in response to determining the packet received to be the device cloud packet, processing, by the DDCF, the device cloud packet.

17. The method of claim 16, further comprising:

applying a dynamic binding between the upper layer and the DDCF to indicate the destination layer of the packet; or configuring a fixed transport layer port number for the DDCF to indicate the destination layer; or using an indicator in a header of the packet to indicate the destination layer.

18. The method of claim 16, wherein the DDCF determines whether the packet received is a network packet or a device cloud packet using a Protocol Version field in the packet.

19. The method of claim 1, wherein the DDCF is placed above a network layer, and network connectivity between the device and the neighboring devices is supported.

20. The method of claim 19, wherein the DDCF message is encapsulated in a network packet, and the DDCF is further configured to identify a destination layer of the DDCF message with a transport layer port number.

21. The method of claim 1, wherein the device is without a network layer, and the DDCF is placed above a data link layer.

22. An apparatus for wireless communication, the apparatus being a device, comprising:

a memory; and at least one processor coupled to the memory and configured to:

handle, by a distributed device cloud function (DDCF) of the device, communication for the device with one or more neighboring devices in a subnetwork via underlying access technologies; and orchestrate, by a device compute orchestrator (DCO) of the device, dynamic sharing of compute resources and network connectivity resources of the device with the neighboring devices in the subnetwork, wherein the orchestrating comprises the device borrowing compute resources from at least one of the one or more neighboring devices, wherein the DDCF and the DCO are operable to enable the handling of communication and the orchestrating of dynamic sharing within the subnetwork regardless of whether the device is connected to an overlay network, wherein the DCO is placed above a transport layer of the device, wherein the device autonomously manages the DCO independently without being connected to an operator's network, wherein the DDCF works as a control plane for subnetworking operations and as a protocol layer that generates device cloud packets or encapsulates/decapsulates packets passing through the DDCF, and wherein the orchestrating further comprises, prior to running microservices in the at least one of the one or more neighboring devices, discovering the at least one of the one or more neighboring devices by sending resource discovery requests and establishing a device cloud frame switching/forwarding table based on responses from the one or more neighboring devices.

* * * * *